United States Patent
Zou et al.

(10) Patent No.: US 7,033,555 B2
(45) Date of Patent: Apr. 25, 2006

(54) LOW TEMPERATURE LITHIATION OF MIXED HYDROXIDES

(75) Inventors: Feng Zou, Oakville (CA); Mohammad Jahangir Hossain, Mississauga (CA); Juraj Babjak, Mississauga (CA); Quan Min Yang, Mississauga (CA); Samuel Walton Marcuson, Mississauga (CA)

(73) Assignee: Inco Limited, Toronto (CA)

( * ) Notice: Subject to any disclaimer, the term of this patent is extended or adjusted under 35 U.S.C. 154(b) by 535 days.

(21) Appl. No.: 10/430,154

(22) Filed: May 6, 2003

(65) Prior Publication Data
US 2004/0223905 A1 Nov. 11, 2004

(51) Int. Cl.
*C01D 15/00* (2006.01)

(52) U.S. Cl. ............... 423/179.5; 423/593.1; 423/594.4; 423/594.6; 423/599; 423/594.15; 423/594.19; 423/605; 423/641; 423/196; 423/184

(58) Field of Classification Search ............. 423/593.1, 423/594.4, 594.6, 599, 594.15, 594.19, 605, 423/641, 196, 179.5, 184
See application file for complete search history.

(56) References Cited

U.S. PATENT DOCUMENTS

| | | | |
|---|---|---|---|
| 4,567,031 A | 1/1986 | Riley | 423/593 |
| 5,356,731 A | 10/1994 | Sitters et al. | 429/45 |
| 5,630,993 A | 5/1997 | Amatucci et al. | 423/594 |
| 5,891,416 A | 4/1999 | Yamazaki et al. | |
| 6,048,643 A | 4/2000 | Van Ghemen et al. | 429/218 |
| 6,296,972 B1 | 10/2001 | Hong et al. | 429/223 |
| 6,399,041 B1 | 6/2002 | Ado et al. | 423/594 |
| 6,447,739 B1 * | 9/2002 | Krynitz et al. | 423/179.5 |
| 6,589,695 B1 | 7/2003 | Kweon et al. | 429/231 |
| 6,949,233 B1 * | 9/2005 | Kweon et al. | 423/179.5 |
| 6,960,335 B1 * | 11/2005 | Singhal et al. | 423/599 |
| 2001/0016284 A1 | 8/2001 | Kweon et al. | |
| 2003/0022063 A1 | 1/2003 | Paulsen et al. | |
| 2003/0044684 A1 | 3/2003 | Nanamoto et al. | |
| 2004/0241547 A1* | 12/2004 | Gao et al. | 429/231.1 |
| 2005/0130042 A1* | 6/2005 | Liu et al. | 429/231.3 |

FOREIGN PATENT DOCUMENTS

| | | |
|---|---|---|
| CN | 1357491 | 7/2002 |
| EP | 0 867 408 A1 | 9/1998 |
| WO | WO 97/02214 | 1/1997 |

OTHER PUBLICATIONS

Xiaoming et al., "Manufacture of cobalt-lithium oxide", Chemical Abstracts Services, Columbus, Ohio, Jul. 10, 2002, XP002293225.
Holleman and Wiberg, "Lehrbuch der Anorganischen Chemie", Berlin New York, p. 1550, line 1-32, p. 1553, line 25 & p. 1554, line 42.

* cited by examiner

*Primary Examiner*—Stanley S. Silverman
*Assistant Examiner*—Timothy C. Vanoy
(74) *Attorney, Agent, or Firm*—Edward A. Steen

(57) ABSTRACT

A low temperature contaminant limiting process for lithiating hydroxides and forming lithiated metal oxides of suitable crystalinity in-situ. $M(OH)_2$ is added to an aqueous solution of LiOH. An oxidant is introduced into the solution which is heated below about 150° C. and, if necessary, agitated. M may be selected from cobalt, nickel and manganese. The resultant $LiMO_2$ becomes crystallized in-situ and is subsequently removed.

20 Claims, 3 Drawing Sheets

LOW TEMPERATURE LITHIATION OF MIXED HYDROXIDES $LiCoO_2$ (lithium cobalt oxide) is currently used as the major active cathodic material in lithium-ion batteries.

Typically, most commercial lithium cobalt oxide is made by a solid-state reaction between a lithium compound and a cobalt compound occurring at high temperatures (900–950° C.) for many hours. This process requires steps involving excessively long time heat treatments combined with good mixing steps as ball milling or other fine grinding methods. Variations include aqueous solutions, extensive pre-mixing, mechanical alloying, sol-gel, spray drying, solution combustion, catalysts, co-precipitation, etc. Often, these processes are complex or produce pollutants that must be treated.

There are reported attempts to produce $LiCoO_2$ at lower temperatures.

For example, Chinese patent application CN 1357491 (published Jul. 10, 2002 to Z. Huang and X. Xi) discloses an aqueous synthesis of $LiCoO_2$ by low temperature mixing and oxidizing and followed by a subsequent high temperature crystallization heat treatment. A lithium salt, an oxidized phase of a cobalt compound and an "activator" believed to be catalyst (such as $NaNO_3$, NaCl, $K_2SO_4$, KOH, etc.) are combined in a reactor at 30–120° C. for 0.5–30 hours. The inventors claim to obtain amorphous $LiCoO_2$. The resulting end product is subsequently fired in a high temperature furnace (300–950° C.) for up to an additional 24 hours to crystallize the lithium cobalt oxide. It is then cooled at a controlled rate.

The aforementioned process utilizes extraneous activators or catalysts that may contaminate the lithiated product.

Accordingly, there is a need for a simple low temperature process for producing crystallized pure or doped lithiated cobalt oxides.

In addition, other lithium metal oxides have been extensively studied as alternatives to $LiCoO_2$. Among them, Ni/Mn or Ni/Mn/Co based mixed lithium oxides with layered structures are considered promising cathode materials for Li batteries with better performance including large scale automotive applications than the currently used $LiCoO_2$. Again, high temperature solid-state reactions are generally used to produce these materials.

Accordingly, there is also a need for a simple, low temperature process for producing crystallized mixed lithiated metal oxides.

SUMMARY OF THE INVENTION

There is provided a low temperature, environmentally friendly process for producing $LiMO_2$ and similar materials by combining $M(OH)_2$ (M being a selected metal or metal combination suitable for lithium-ion energy cells including cobalt, nickel, manganese, etc.), LiOH and water to form a slurry solution. An oxidant, such as oxygen or an oxygen containing gas such as air, is introduced into the solution and the mixture is heated to about 30–150° C. The resultant lithiated compound crystallizes in-situ.

PREFERRED EMBODIMENTS OF THE INVENTION

Figure 1:
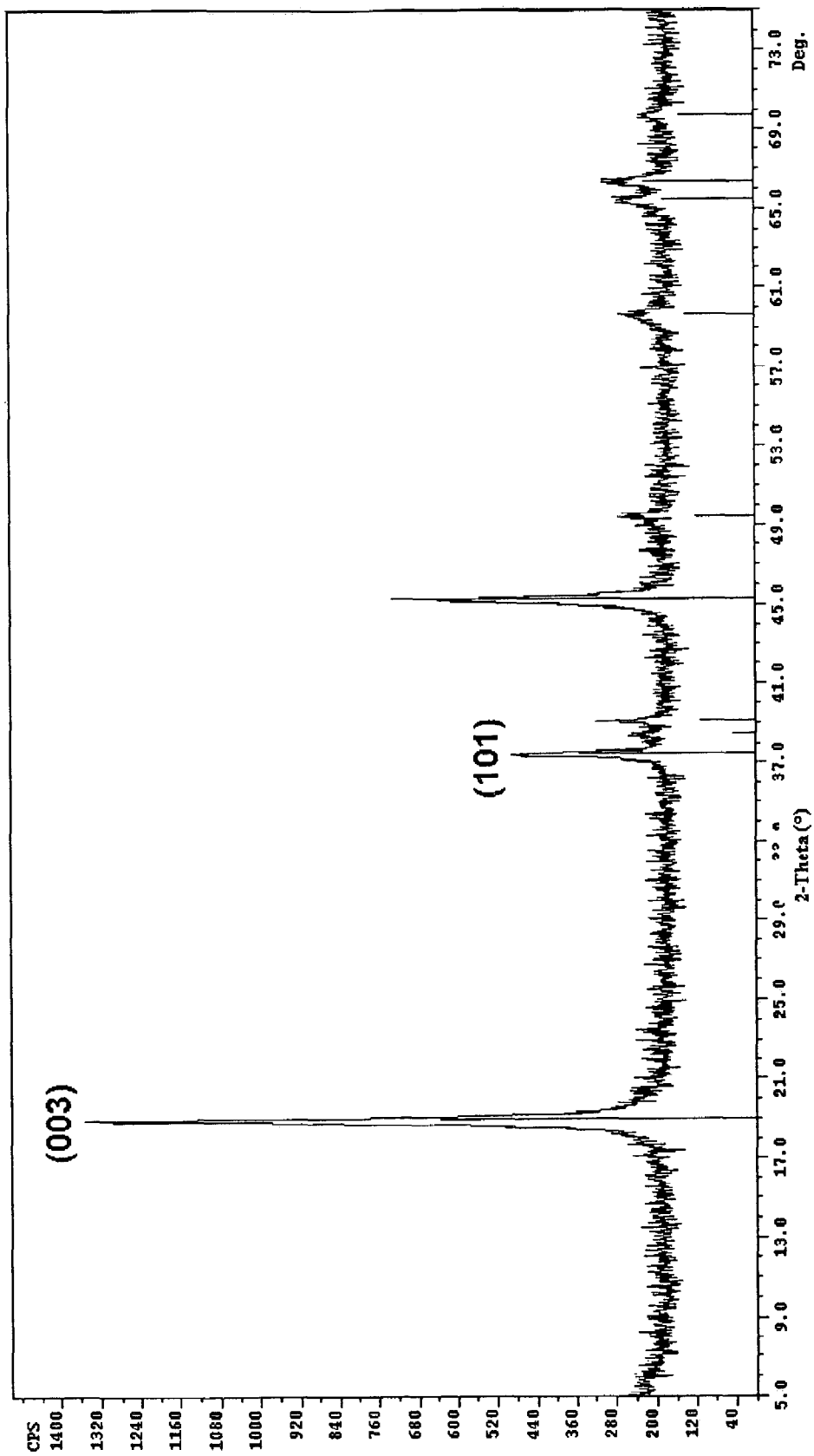
FIG. 1 is an x-ray diffraction pattern of an embodiment of the invention.

The adverb "about" before a series of values will be construed as being applicable to each value in the series unless noted to the contrary.

As noted above, $LiCoO_2$ is currently used as a cathodic material in lithium battery systems. Other mixed $LiMO_2$ (M=Ni, Mn, Co, etc) compounds are also under development.

The present low temperature process for making a lithiated oxide is relatively simple and more efficient when compared to current commercial techniques.

$M(OH)_2$ is added to an aqueous solution with a high concentration of LiOH to form a slurry solution. An oxidant is introduced into the slurry with appropriate agitation at a temperature of about 30–150° C., preferably about 80–120° C., at essentially atmospheric pressure for about 2–24 hours or until the crystallized product has formed. The solid/liquid separation can be accomplished by filtrating or centrifuging the reacted slurry. The reaction is a combination of the oxidation of $M(OH)_2$ and insertion of Li ions into the layered structure. Therefore, reaction conditions with higher Li concentrations are more favorable for completing the reaction. The solubility of LiOH in water is about 5M at room temperature, but it is around 8M at 100° C. Most importantly, with the present low temperature process, no contaminants will be introduced into the product because no activators or catalysis are required during the reaction and only LiOH, $M(OH)_2$ and oxygen (pure or as part of a simple oxidant) are used as the reactants. Moreover, no waste is generated because the filtrate, mainly containing LiOH, is reusable. The cleansed filtrate may be recycled.

The benefits using the present invention over commercial processes include:

1) The avoidance or substantial shortening of the subsequent high temperature crystallization heat treatment as compared to the conventional solid reaction route. If desired, an optional heat treatment of about 0.5–8 hours appears to provide additional results, as opposed to current 12–30 hour multiple-stage heat treatment regimens.

The present process generates lithiated layered-oxide (space group: R-3 m) with (003)FWHM (Full Width Half Maximum) of about 0.3° and (101)FWHM of about 0.2° without the need for a subsequent heat treatment. However, if higher crystallinity levels are desired, a subsequent heat treatment step may be utilized. However, in contrast to the prior art since the lithiated oxide compound is already sufficiently crystallized, the time for the optional heat treatment step to raise crystallinity higher is significantly shorter by the order of 10–12 hours.

2) By preferably utilizing $M(OH)_2$ particles as a precursor as opposed to ball milled ingredients, the present process generates lithiated oxide powder product without breaking or aggregating the original particles. This results in better control of both powder size and morphology. Moreover, the entire prior art ball milling process or other mixing process is eliminated.

3) By utilizing a relatively low processing temperature below about 150° C. a desirable lithiated product is sufficiently formed. Therefore the problems associated with diffusion and atmospheric controls for heat treatment are reduced.

As a result of the improved morphologies and less critical control demands brought by lower temperature processing, production efficiencies may be realized since a continuous rotary furnace may be employed for heat treatment rather than a batch static furnace.

Operating at levels greater than about atmospheric pressure may increase the kinetics of the process although higher pressures inevitably raise cost issues.

A number of trials were conducted to test the efficacy of the present process.

A) $LiCoO_2$ was produced in the following manner:

100 grams of $Co(OH)_2$ were introduced into a 1000 mL vessel having a LiOH concentration in water of about 5–8M at atmospheric pressure. Oxygen gas was introduced into the vessel at a flow rate of about 100–150 mL/minute. The temperature of the solution was maintained between about 80–120° C. and agitated with an impeller at about 750 revolutions per minute for about 24 hours. Upon completion of the process, the solution was filtered and the crystallized solid powder $LiCoO_2$ with layered structure was collected. (003)FWHM of about 0.3° and (101)FWHM of about 0.2° from XRD spectra were measured for the sample without any heat treatment. Upon review of the data, the actual processing time may be reduced to about 5 hours.

It is preferred to utilize a spherical $M(OH)_2$ precursor or another high quality compound since spherical particles appear to improve the properties of the product.

FIG. 1 shows an XRD (x-ray defraction) of resulting crystallized $LiCoO_2$. There is no need to heat treat the product unless higher crystallinity is required. If so, an optional heat treatment of about 400–850° C. for about 0.5–8 hours may be utilized. For example, after seven hours of heating the above aqueous lithiated sample at 850° C., the (003)FWHM and (101)FWHM reached about 0.09° and 0.08° respectively.

Figure 2:
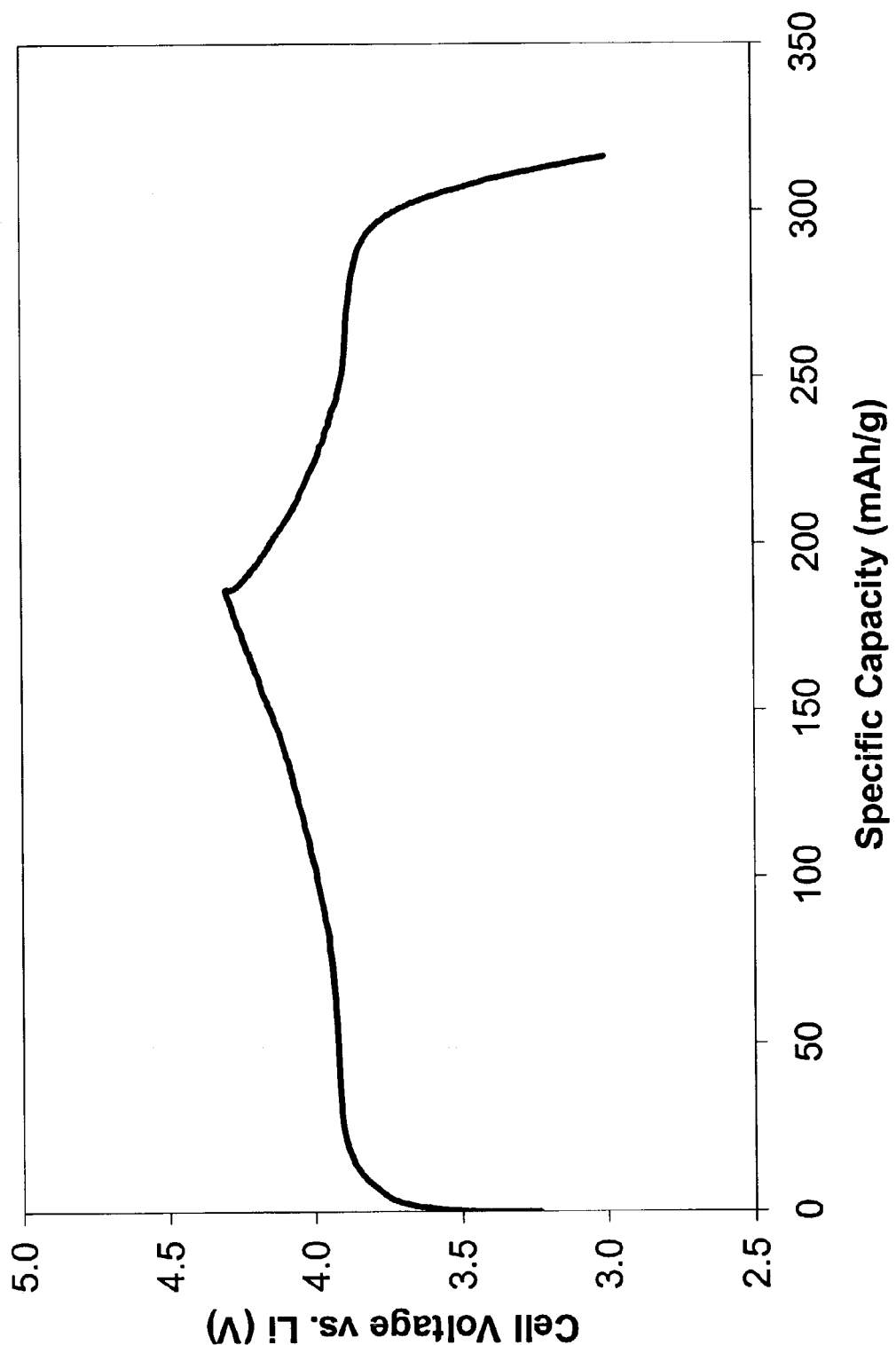
FIG. 2 is a charge/discharge curve at c/10 rate in a cell.

FIG. 2 shows the result of an electrochemical c/10 test at c/10 rate in a small cell on the lithiated sample without heat treatment (the sample was dried at about 100° C.). The discharge capacity is approximately 130 mAh/g.

The present process may be used for crystallized multiple lithiated oxide compounds. For example, it appears that some mixed or multiple oxides may have better properties than $LiCoO_2$ in lithium-ion cells. By introducing a mixed hydroxide precursor into the lithium hydroxide solution at a relatively low temperature excellent results are achieved.

Figure 3:
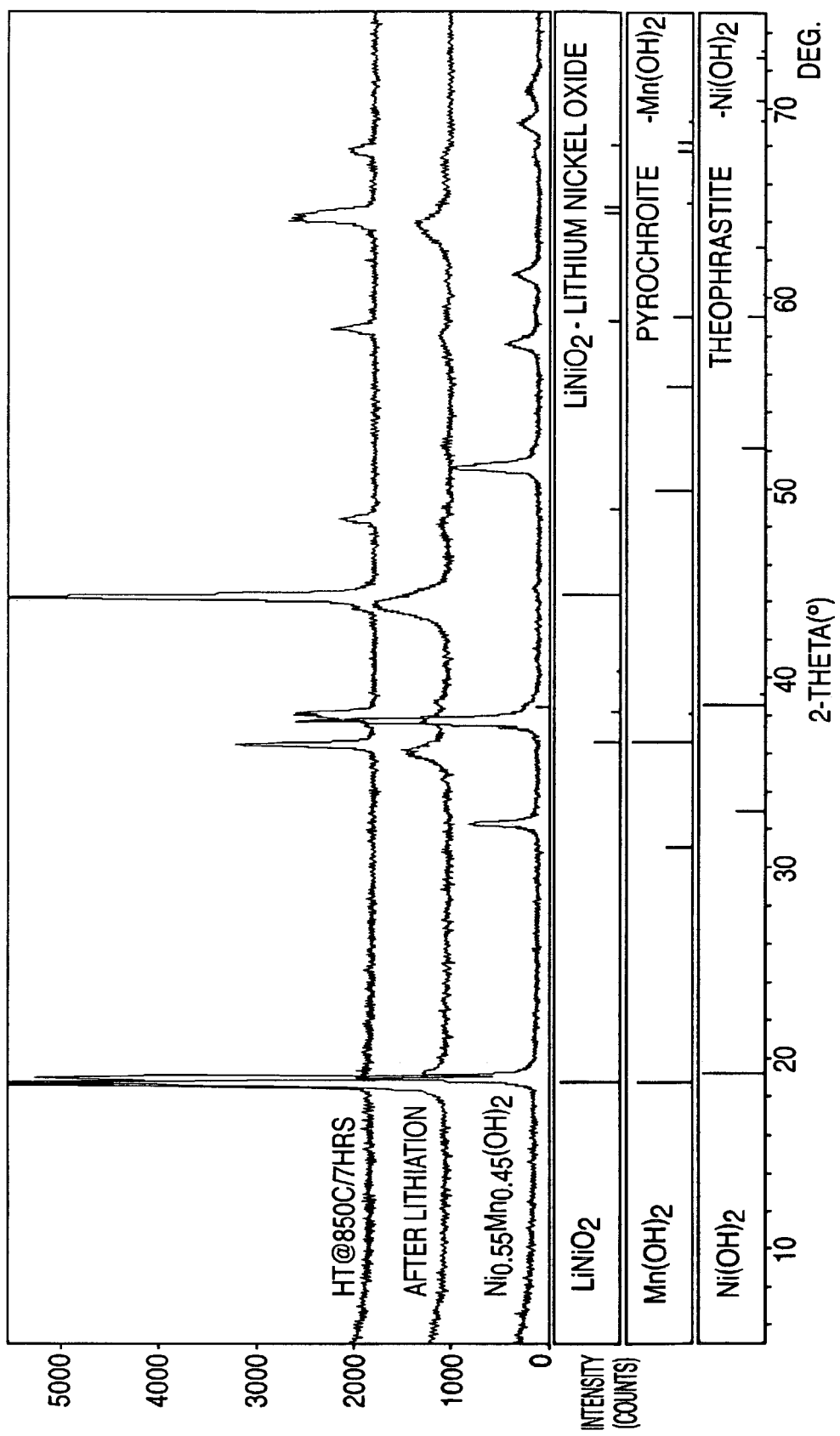
FIG. 3 is an x-ray diffraction pattern of an alternative embodiment of the invention.

B) Using the same parameters as above, $Ni_{0.55}Mn_{0.45}(OH)_2$ as a precursor was introduced into the above 4–8M LiOH solution and heated at about 80–120° C. for about 24 hours. $O_2$ was introduced as the oxidant. The favorable results—layered $LiNi_{0.55}Mn_{0.45}O_2$—are shown in FIG. 3 after lithiation in an aqueous slurry solution. Crystallinity was measured at (003)FWHM of about 0.24° and (101) FWHM of about 0.78°. An optional heat treatment at about 850° C. for seven hours increased the crystallinity to (003) FWHM of about 0.10° and (101)FWHM of about 0.17°.

C) Using the same parameters as above, $Ni_{0.55}Mn_{0.45}(OH)_2$ as a precursor was introduced into the above 4–8M LiOH solution and heated at about 80–120° C. for about 24 hours. Air was introduced as the oxidant at 350 mL/minute. The layered product of $LiNi_{0.55}Mn_{0.45}O_2$ was obtained. Crystallinity was measured at (003)FWHM of about 0.30° and (101)FWHM of about 0.89°.

Other mixed lithiated products such as $LiNi_{1/3}Co_{1/3}Mn_{1/3}O_2$, etc. may also be made by the present process.

The instant process easily lends itself to the introduction of other compositions including doping elements such as Al and Mg. Moreover, as noted in Example C), other simple oxidants such as air may be used in conjunction with or as a substitute for oxygen.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The invention claimed is:

1. A process for lithiating hydroxides to form a crystallized lithiated oxide, the process consisting essentially of:
   a) providing an aqueous solution of LiOH;
   b) introducing $M(OH)_2$ into the solution wherein M is selected from a group consisting of at least one metal appropriate for the operation of a lithium-ion energy cell;
   c) introducing an oxidant selected from the group consisting of oxygen and air into the solution;
   d) maintaining the temperature of the solution below about 150° C;
   e) agitating the solution;
   f) causing the lithiated oxide to crystallize in-situ; and
   g) collecting the lithiated oxide from the solution.

2. The process according to claim 1 wherein the aqueous solution of LiOH is about 2–8M.

3. The process according to claim 2 wherein the aqueous solution of LiOH is about 4–8M.

4. The process according to claim 1 wherein M is selected from the group consisting of Co, Ni, and Mn.

5. The process according to claim 1 wherein the lithiated oxide includes a doping element.

6. The process according to claim 5 wherein the doping element is selected from the group consisting of Al and Mg.

7. The process according to claim 1 wherein the temperature of the solution is about 30–150° C.

8. The process according to claim 7 wherein the temperature is about 80–120° C.

9. The process according to claim 1 wherein the reaction time is about 1–24 hours.

10. The process according to claim 1 carried out at about atmospheric pressure and above.

11. The process according to claim 1 including heat treating the crystallized lithiated oxide to increase its crystallinity.

12. The process according to claim 11 wherein the heat treatment is conducted at about 300–1000° C.

13. The process according to claim 12 wherein the heat treatment is conducted at about 500–900° C.

14. The process according to claim 11 wherein the heat treatment occurs for about 0.5–8 hours.

15. The process according to claim 1 resulting in the formation of crystallized $LiCoO_2$.

16. The process according to claim 1 resulting in the formation of crystallized $LiNi_{0.55}Mn_{0.45}O_2$.

17. The process according to claim 1 resulting in the formation of crystallized $LiNi_{1/3}Co_{1/3}Mn_{1/3}O_2$.

18. The process according to claim 1 including recycling the LiOH solution after the lithiated oxide is collected from the solution.

19. The process according to claim 1 wherein $Ni_{0.55}Mn_{0.45}(OH)_2$ is introduced into the aqueous solution of LiOH.

20. The process according to claim 1 including introducing $M(OH)_2$ particles into the solution.

* * * * *